Figure 1:
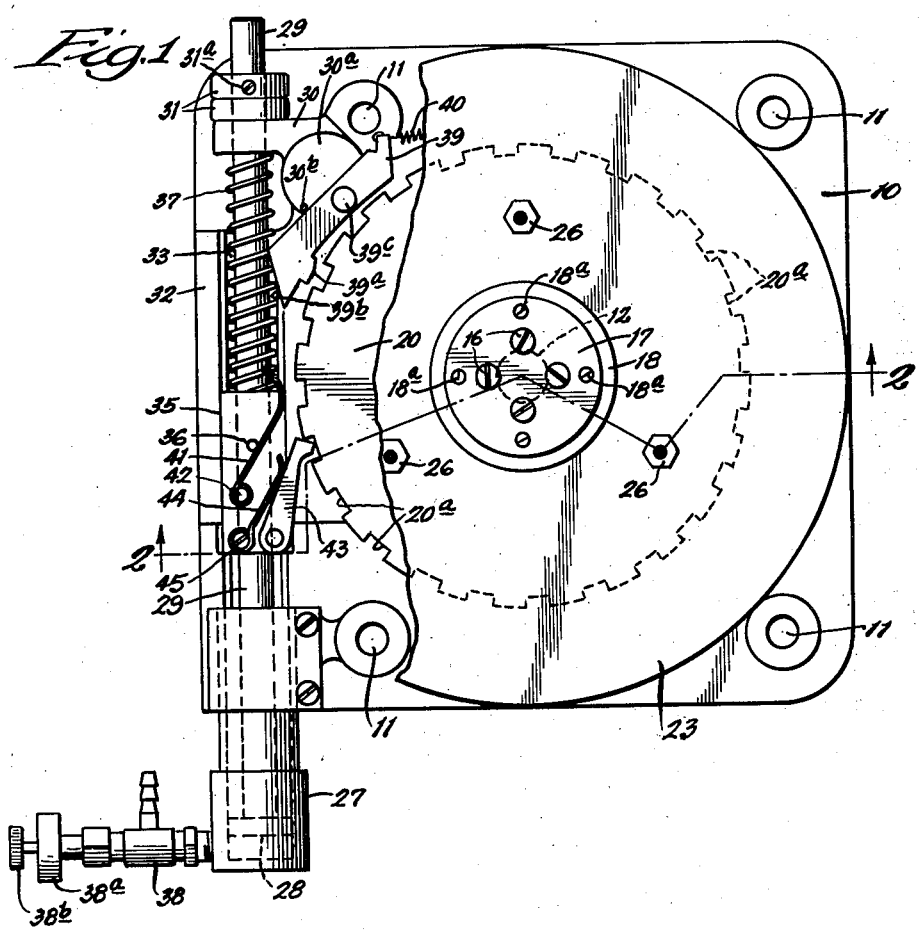

Nov. 25, 1952 — T. E. MEAD — 2,618,982

INDEXING APPARATUS

Filed May 20, 1949 — 2 SHEETS—SHEET 1

INVENTOR:
Theodore E. Mead,
BY Dawson, Orms, Booth & Spangenberg,
ATTORNEYS.

Nov. 25, 1952 T. E. MEAD 2,618,982
INDEXING APPARATUS
Filed May 20, 1949 2 SHEETS—SHEET 2
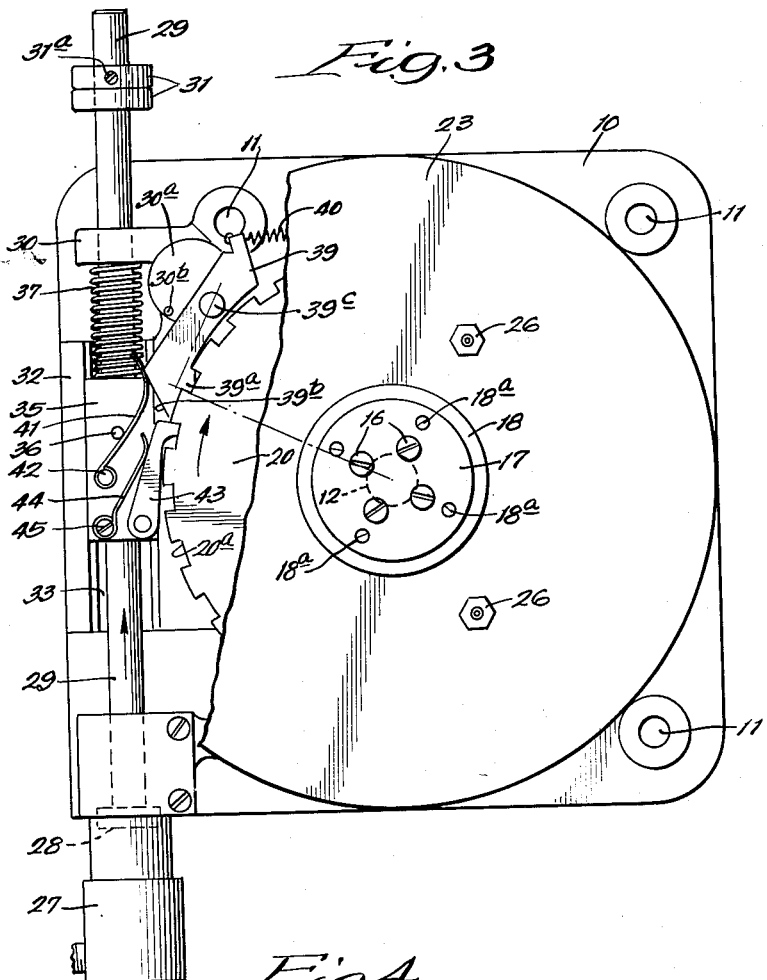
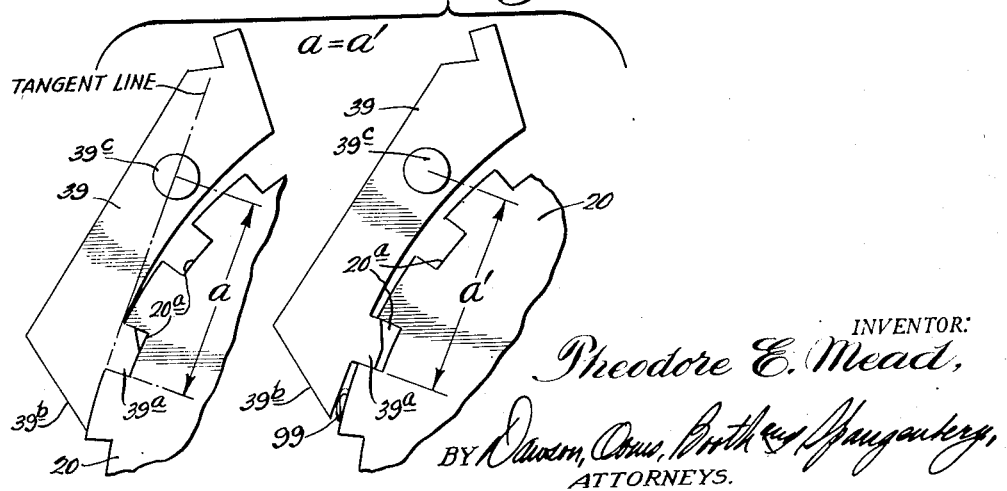
INVENTOR:
Theodore E. Mead,
BY Dawson, Ooms, Booth and Spangenberg,
ATTORNEYS.

Patented Nov. 25, 1952

2,618,982

UNITED STATES PATENT OFFICE 2,618,982

INDEXING APPARATUS

Theodore E. Mead, Wilmette, Ill.

Application May 20, 1949, Serial No. 94,417

3 Claims. (Cl. 74—128)

This invention relates to indexing apparatus; in particular, it concerns apparatus for accurately positioning at a succession of stations a work feeder or other work-supporting member.

The particular embodiment of my invention described in detail herein is a rotary work feeder which may be used for supporting in a desired position a plurality of different work pieces and for successively moving such work pieces into position for processing by an automatic operation and for carrying such pieces away after the processing step has been performed on them. The essence of my invention lies in improved means for shifting a work support or feeder from one desired position to the next desired position speedily and accurately. Many applications arise in industry for indexing apparatus capable of accomplishing such fast and accurate positioning of parts, and many uses for the apparatus herein described, other than those specifically suggested herein, will occur readily to persons skilled in the art.

Accordingly, the principal object of my invention is to provide an indexing apparatus which is positive in action, accurate in its positioning, and effective to lock the movable member against movement in either direction during the intervals when the apparatus is stationary.

Another object of my invention is to provide an accurate indexing apparatus, particularly well adapted for use with a rotary work support, wherein both the intermittent advance of the support and its accurate positioning are accomplished by a reciprocating motion such as may be obtained from a pneumatic power cylinder.

A further object of my invention is to provide an improved ratchet mechanism for an intermittently-moved work support wherein the accuracy of indexing is independent of the conformation or degree of wear of the pawl which advances the work support.

A still further object of my invention is to provide a rotary work support or work feeder having accurate indexing mechanism operative responsively to intermittently supplied pulses of compressed air and adjustable to permit variation of the arc of rotation experienced by the work support between successive indexing operations.

Still another object of my invention is to provide, in a rotary work feeder, a pneumatically actuated indexing apparatus in which an independently functioning indexing member is actuated automatically in timed relationship with a ratchet mechanism which accomplishes intermittent rotary motion of the feeder.

Other objects and advantages of my invention will appear as the specification proceeds.

Figure 2:
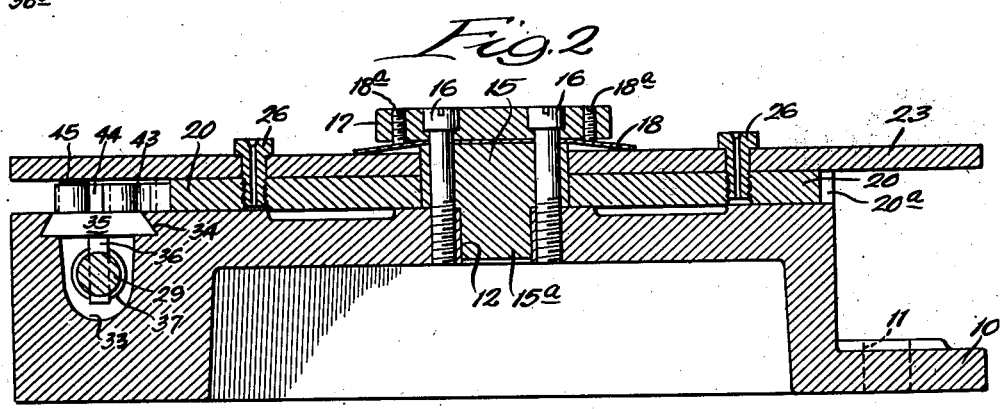

The invention is illustrated in a single embodiment in the appended drawing, of which Figure 1 is a plan view, partially broken away, of a rotary work feeder or work support embodying my invention; Fig. 2, is a side sectional view of a portion of the structure of Fig. 1, the section being taken along the line 2—2 of Fig. 1; Fig. 3, a plan view similar to Fig. 1 but illustrating the position of the apparatus at a different stage in its cycle of operation than that shown in Fig. 1; and Fig. 4, a detail view explanatory of the operation of the locking pawl which is a distinctive and important part of my invention.

Automatically indexing work supports of the type shown and described herein are quite generally used in industry; devices of this type have in common the property that they all move a plate or other work-carrying support in successive steps so as to successively bring work pieces into a position for processing. The type of processing operation may vary widely; it may be a drilling operation, a punching operation, a milling operation, or any of the many other types of processing steps involved in mass production. I have shown and described herein a greatly improved rotary work support or work feeder of the type described; I have shown its work-carrying plate unmodified for any special task; persons skilled in the art will readily think of many applications for such apparatus in mass production operations. Accordingly, I desire that it be understood that the embodiment herein shown is purely for illustrative purposes.

The apparatus shown in the drawings is mounted upon a base member 10, which normally will be a casting. It may, if desired, be bolted to a table or other firm support by bolts, 11.

As is shown in Figs. 1 and 3, the over-all shape of base 10 is roughly rectangular, but it contains an annular central aperture, the inner face of which is denoted 12. A boss 15 is centered on the upper surface of base casting 10 and is bolted thereto by a plurality of bolts 16. As may be seen by reference to Figs. 1 and 2, boss 15 is cylindrical in shape and is provided with an under portion 15d of reduced diameter which fits within and is concentric with the central aperture in base 10.

A rotary structure, to be described, is mounted on base 10 and adapted to rotate around boss 15 as an axle. The foundation component of this rotary structure is an indexing disc 20, which rests on base 10 and is provided around its periphery with a plurality of symmetrically disposed radial recesses 20a. In the example shown, twenty-four of the recesses 20a are provided around the rim of disc 20. That number is illustrative only, and any desired number may be used. Disc 20 has a central aperture which fits snugly over boss 15 and forms a bearing therewith.

A main work-support disc 23 rests on disc 20 in concentric relation thereto and is securely bolted to disc 21 by a plurality of bolts 24. Disc 23 also has a central aperture for co-operation with boss 15. Disc 23 is shown as having a flat, unmodified upper surface. In practice, it would be normally specially formed with dies, recesses, or other modifications adapted to carry work pieces. In a typical installation, a large number of discs 23 might be maintained in reserve, each of the discs being modified to equip it for the performance of some particular task.

As will be noted, boss 15 in the illustrated embodiment is provided with a flat upper cap or crown 17 which has enlarged diameter and thus extends radially to overhang disc 23. A spring member 18 of circular shape is carried between cap 17 and disc 23. Cap 17 and member 18 are both held in position by the same bolts 16 which secure boss 15 to base 10. Set screws 18a, mounted in cap 17, provide a means of controlling the force exerted on disc 23 by spring member 18.

The flat upper surface of cap 17 provides a convenient stationary surface, centrally located with respect to the rotatable work-support structure, which may be conveniently employed to support ejector cams or other devices useful in carrying out the functions of the apparatus.

Near one corner of the base plate 10 a pneumatic power cylinder 27 is mounted. Cylinder 27 carries within it the usual piston 28; a piston rod 29, carried by piston 28, extends along one entire side of base plate 10 and is supported at its far end by a bearing member 30 which is integrally formed in base casting 10. An adjustable collar 31 is mounted on the piston rod 29 beyond the bearing member 30; a set screw 31a in the collar 31 permits collar 31 to be locked on piston rod 29 at any desired position.

As is best shown in Fig. 2, base casting 10 contains an elongated recess 33 through which piston rod 29 extends in its span from power cylinder 27 to bearing member 30.

The side walls of elongated horizontal recess 33 in base casting 10 are provided with a pair of dovetailed ways or recesses 34 which serve as track or guide members for a carriage 35. Carriage 35 is keyed to piston rod 29 by a drive pin 36. Carriage 35 has side walls formed to dovetail into the tracks or ways 34 in the sides of recess 33.

A coil spring 37 is carried on piston rod 29 between the bearing member 30 and carriage 35; spring 37 is normally extended, so that it presses against bearing member 30 and urges carriage 35 and piston 28 toward the closed end of pneumatic cylinder 27.

A combined air-hose coupling and valve member 38 is threaded into the closed end of power cylinder 27 so as to permit the introduction of compressed air into the space between the end wall of cylinder 27 and piston 28. Adjustable check valves governing the rate of admission and exhaust of air to cylinder 27 are carried within coupling member 38 and are adjustable respectively by thumb screws 38a and 38b. It will be understood that a coupling having adjustable valves is a refinement which may be dispensed with if desired.

A pawl 39 is pivoted on a flat horizontal surface 30a machined onto an extension of bearing member 30. Pawl 39 is positioned where it can swing forward into engagement with the rim of indexing disc 20; the edge of pawl 39 adjacent disc 20 is provided with an extension 39a having sufficient length to match substantially the depth of the recesses 20a and having side faces machined to meet the rim of disc 20 in a position substantially normal to the rim at the point of engagement. Stated differently, the side faces of extension 39a on pawl 39 are perpendicular to a line tangent to the rim of disc 20 at the point whereat extension 39a engages disc 20. The pivot 39c is located on the tangent line just referred to; this pivot location plays an important part in the improved operation which characterizes my invention. This subject will be fully treated hereinafter.

The trailing edge of extension 39a, that is, the edge nearest pivot 39c, is truncated as shown best in Figs. 1, 3, and 4. A stop pin 30b pressed into a suitable aperture in the flat surface 30a serves to arrest movement of pawl 39 in the direction in which extension 39a is retracted from disc 20. A spring 40, connected between pawl 39 and any convenient fixed point, maintains pawl 39 in a normally retracted position.

The end of pawl 39 opposite spring 40 has a generally trapezoidal conformation, the end surface 39b of pawl 39 being formed to make an acute angle with the face of pawl 39 adjacent disc 20.

Carriage 35 carries on its upper surface a leaf spring 41 secured to carriage 35 by pin 42. Spring 41 is generally straight except for its free end, which is gently curved away from disc 20, as shown clearly in Figs. 1 and 3. Pin 36 extends sufficiently above the upper surface of carriage 35 to engage spring 41 when it is being urged away from disc 20.

The upper surface of carriage 35 also carries a pawl 43 which is pivoted to carriage 35 at a point behind pin 42. Pawl 43 is adapted to swing into engagement with disc 20, and its free end may be formed to facilitate engagement with recesses 20a for achieving rotation of disc 20. The side edge of pawl 43 adjacent disc 20, however, is provided with a gently-rounded surface adapted to slide readily over the rim of disc 20 without engaging any of the recesses therein. Accordingly, as may be seen from inspection of Figs. 1 and 3, pawl 43 is designed to co-operate with the recesses 20a to form a ratchet structure whereby the forward motion of carriage 35 will cause clockwise rotation of disc 20 but retraction or backward motion of carriage 35 will not induce any rotation of disc 20. A leaf spring 44 is secured to carriage 35 by a pin 45 and is adapted to press against pawl 43 so as to urge it against the rim of disc 20.

*Operation*

It will be understood, in this description of the operation of my invention, that a suitable source of compressed air has been connected to the coupling member 38 and that such source is under the control of a valve (not shown) which admits compressed air to the cylinder 28 and vents it therefrom according to the will of the operator or, in many instances, on a timed systematic basis.

During the time that my rotary work support is being held in a particular position to permit an operation on one or more of the work pieces carried by it, the compressed air is admitted to the cylinder 27 and the piston 28 is accordingly fully advanced in the cylinder 27, as shown in Fig. 3. When a particular operation has been completed and it is desired to advance the rotary structure another step, the compressed air is vented from cylinder 27, and the piston 28, under the urging of spring 37, returns to its retracted position as shown in Fig. 1. It will be noted from that figure that as the piston 28 and carriage 35 move backward under the urging of spring 37, the pawl 43 slides successively past the recesses 20a and, when the carriage 35 comes to a stop, the pawl 43 is resting within one of the recesses 20a in position to engage it and rotate the disc 20 on the next advance movement of carriage 35. The distance that piston 28, piston rod 29, and carriage 35 are permitted to move in the backward or retracting direction is governed by the position of collar 31 on piston rod 29. As the apparatus is shown in Figs. 1 and 3, collar 31 is locked or keyed to shaft 29 in a position such that it engages bearing member 30 and prevents further retraction of piston rod 29 and its associated apparatus when pawl 43 has entered the second recess 29a, counting around the rim of disc 20 from the recess occupied by pawl 43 in its previous advanced position. It will be understood that by appropriate adjustment of collar 31, pawl 43 may be made to engage the first recess 20a back of its previous advanced position or the third such recess, according to the angular movement to be imparted to the rotary structure at each step.

When the control valve is again actuated to admit compressed air to cylinder 27, piston 28, piston rod 29, and carriage 35 will move forward. During the initial portion of this movement pawl 39 is held in a retracted position by spring 40 where it does not engage disc 20. As a result, disc 20 and the rotary structure associated therewith are free to rotate under the urging of pawl 43 which, as may be seen, is in engagement with one of the recesses 20a.

As the forward movement of carriage 35 continues, the leaf spring 41 engages the inclined face 39b of pawl 39 and forces extension 39a into engagement with the rim of disc 20. The advance of carriage 35 and the consequent rotation of disc 20 continue after extension 39a is in engagement with the rim of disc 20 only until one of the recesses 20a moves into registration with the extension 39a. When that point is reached, extension 39a drops into the recess 20a under the urging of leaf spring 41, and the rotary structure is thereupon locked against further rotation in either direction by the co-operating action of the pawls 39 and 43.

The co-operation of extension 39a and recess 20a is considerably facilitated by the inclined or truncated portion at the leading edge of member 39a. This construction permits member 39a to commence gradual radial movement before recess 20a has moved fully into engagement with it and complete seating of member 39a can thus be accomplished more rapidly after the full registration point is reached.

After pawl 39 has seated in one of the recesses 20a, pawl 43 being securely engaged in the adjacent recess 20a, the disc 20 and its associated rotary structure are locked at a precisely predetermined angular position and held there against rotation in either direction so long as the fluid pressure is maintained in cylinder 27. This position of the apparatus is shown in Fig. 3. At the operator's will the compressed air in cylinder 27 may be vented and the piston 28 and its associated elements will then retract under the urging of spring 37 and a new indexing cycle will be commenced.

As will be apparent from inspection of Figs. 1 and 3, adjustment of collar 31 to a position where pawl 43 engages the first slot to the rear of the one previously occupied will result in the intermittent rotation of the rotary structure in steps of 15° each, while adjustment of collar 31 to cause pawl 43 to engage the second recess to the rear of the one previously engaged will produce rotation in 30° steps. It will be understood that by the use of the appropriate number of recesses on the disc 20, the successive indexing operations may achieve any desired degree of rotation per step.

One of the great advantages of my invention over prior-art structures is the extreme accuracy with which its indexing operation is accomplished. This results in large part from the novel structure of pawl 39 and its associated apparatus.

One feature which contributes greatly to this accuracy is the design which avoids a rubbing contact between the leading edge of member 39a and the side of recess 20a. The width of member 39a, being a few thousandths of an inch less than that of the recesses 20a, permits member 39a to drop into seated position as soon as the truncated trailing edge has cleared the recess 20a. The leading edge of member 39a and the co-operating edge of recess 39a thus come into abutment without sliding. Wear of the critically important leading edge of member 39a is thus negligibly small and it will continue to produce accurate indexing indefinitely.

Another feature of very great importance in making my invention accurate in indexing operations is the design of pawl 39 wherein its pivot 39c is placed on the line tangent to the rim of disc 20 at the point whereat the leading edge of member 39a abuts the side wall of recess 20a. The special advantage of this construction is shown in Fig. 4, where two views are shown of pawl 39 in engagement with a recess 20a in disc 20. In the left-hand view of Fig. 4, pawl 39 is fully seated, as in normal operation. The distance between the edge of recess 20a in abutment with member 39 and the pivot 39c is indicated by the arrow "a." In the right-hand view of Fig. 4, a metal chip 99 has become lodged between pawl 39 and the rim of disc 20; as a result, member 39a cannot seat fully into recess 20a. Nonetheless, the distance, marked "a'," between the pivot and the side of recess 20a is, within a margin of ten-thousandths of an inch, equal to the distance "a."

Interference with normal seating by metal chips and other small objects is an inevitable occurrence in a mass production operation, and by placing the pivot of pawl 39 as I have, I have reduced to the absolute minimum the disturbance caused to the accuracy of indexing by such mishaps. In prior-art devices, where the pawl is not pivoted on the tangent line, the error in indexing resulting from mis-seating of the pawl is often so great as to spoil work and thus cause loss as well as delay.

As has been stated herein previously, my invention has a great variety of applications. An application in which it is extremely useful, for instance, is in successively presenting to a machine a series of small work pieces. The small pieces in question may be placed on suitable spindles or in suitable recesses or molds provided around the periphery of the main support disc 23. In such an operation, it is usually desirable that the disc be loaded, manually or automatically, on one side and cleared of the work pieces on the other side, after they have passed by the processing machine. For this purpose, an ejector cam or cams may be provided to engage the work pieces after processing and to sweep them off the rotary structure. Such ejector apparatus can be readily mounted either on the stationary base 10 or on the cap 17. Since in many situations it is desirable to mount such ejector cams inside rather than outside the path of the moving work pieces, I have found the cap 17 particularly useful for that purpose.

While I have described herein a particular embodiment of my invention for purposes of illustration, it will be understood that such embodiment is exemplary only and that many modifications and variations therein may be made by persons skilled in the art without departing from the spirit of my invention. It will be understood that the scope of my invention is not restricted to the particular embodiment shown, but is to be determined by reference to the appended claims.

I claim:

1. Rotary indexing apparatus comprising a disc mounted for rotation and being provided with a plurality of spaced recesses along its periphery, said recesses having radial rear faces, considered with respect to the direction of movement of said periphery, a pawl pivoted adjacent the disc and adapted when advanced to engage one of the recesses, a carriage mounted for reciprocating movement adjacent the disc, said carriage having means operative when the carriage is in a forward position to engage and advance said pivoted pawl, a second pawl pivotally mounted alongside said disc and having a projecting tooth formed for mating cooperation with the recesses in said disc, said tooth being positioned to be received within one of said recesses when said pawl is advanced toward said disc, the pivot of said disc being situated substantially on the line tangent to said disc at the point on the periphery thereof defined by the radial face of the recess receiving said projecting tooth, means carried by said carriage operative when said carriage is advanced to engage said second pawl and press the same against the disc, whereby said disc, during advance of said carriage, is rotated through a predetermined arc by said first pawl and then locked against further rotation in an accurately predetermined angular position by the opposing forces exerted by the first pawl in one recess and the projecting tooth of said second pawl seated within another recess.

2. Indexing apparatus according to claim 1 wherein said projecting tooth on said second pawl is provided with a truncated surface, substantially as shown, on the downstream edge thereof, considered with respect to the direction of movement of said periphery.

3. Apparatus according to claim 1 provided in addition with adjustable means for varying the arc of rotation of the disc accomplished by each forward movement of the carriage.

THEODORE E. MEAD.

REFERENCES CITED

The following references are of record in the file of this patent:

UNITED STATES PATENTS

| Number | Name | Date |
|--------|------|------|
| 370,705 | Koch | Sept. 27, 1887 |
| 688,656 | Lester | Dec. 10, 1901 |
| 699,051 | Wilson | Apr. 29, 1902 |
| 907,228 | Emery | Dec. 22, 1908 |
| 2,398,178 | Ellison | Apr. 9, 1946 |
| 2,471,983 | Spahr et al. | May 31, 1949 |